United States Patent
Anderson et al.

(10) Patent No.: US 6,869,091 B1
(45) Date of Patent: Mar. 22, 2005

(54) METHOD FOR ENHANCING THE PHYSICAL CHARACTERISTICS OF A SUSPENSION COMPONENT

(75) Inventors: Gerald D. Anderson, Oxford, MI (US); Michael W. Mattice, Cambridge (CA); John M. Khoury, Warren, MI (US); Thomas M. Drouillard, Wallaceburg (CA); Kermit G. Rowe, III, Pembroke, KY (US); David I. Fretwell, Rotherham (GB); Alistair B. Lovett, Sheffield (GB)

(73) Assignee: Meritor Suspension Systems Company, Ontario (CA)

( * ) Notice: Subject to any disclaimer, the term of this patent is extended or adjusted under 35 U.S.C. 154(b) by 448 days.

(21) Appl. No.: 09/707,450

(22) Filed: Nov. 7, 2000

(51) Int. Cl.[7] ................................. B60G 9/00
(52) U.S. Cl. ...................... 280/124.164; 29/897.2
(58) Field of Search .................. 280/124.106, 124.152, 280/124.164, 124.165; 29/897.2; 52/735.1

(56) References Cited

U.S. PATENT DOCUMENTS

| | | | |
|---|---|---|---|
| 3,885,775 A | * | 5/1975 | Bolduc |
| 4,138,141 A | | 2/1979 | Andersen |
| 4,610,836 A | * | 9/1986 | Wycech |
| 4,751,249 A | * | 6/1988 | Wycech |
| 4,836,516 A | * | 6/1989 | Wycech |
| 4,978,562 A | * | 12/1990 | Wycech |
| 5,093,990 A | * | 3/1992 | Klippel |
| 5,255,487 A | * | 10/1993 | Wieting et al. |
| 5,588,209 A | | 12/1996 | Fisher et al. |
| 6,233,826 B1 | * | 5/2001 | Wycech |

FOREIGN PATENT DOCUMENTS

| | | |
|---|---|---|
| DE | 90 06 777 | 8/1990 |
| DE | 41 16 837 | 3/1992 |
| DE | 297 04 863 | 5/1997 |
| DE | 197 38 249 | 3/1999 |
| EP | 0 391 222 | 10/1990 |
| EP | 0 960 753 | 12/1999 |
| FR | 2 521 919 | 8/1983 |
| FR | 2 531 014 | 2/1984 |
| GB | 2 069 945 | 9/1981 |

* cited by examiner

Primary Examiner—Avraham Lerner
(74) Attorney, Agent, or Firm—Carlson, Gaskey & Olds

(57) ABSTRACT

A method for enhancing the physical characteristics of a localized area of a suspension component by adding material to the points of high stress without a significant increase in weight or diameter of the suspension component. The material is in the form of a sleeve added to the exterior surface of the suspension component, a core added to the interior surface of a tubular suspension component, winding filaments, or powered material.

10 Claims, 3 Drawing Sheets

METHOD FOR ENHANCING THE PHYSICAL CHARACTERISTICS OF A SUSPENSION COMPONENT

BACKGROUND OF THE INVENTION

The present invention relates generally to a method for enhancing the physical characteristics of a localized area of a suspension component of a vehicle suspension system.

Vehicles are commonly equipped with suspension systems for absorbing road shock and other vibrations, while providing for a smooth and comfortable ride. A suspension component, such as a stabilizer bar, is often used to increase roll rigidity, and control sway as the vehicle turns.

In order to increase the stiffness of a suspension component, it is often necessary to increase its diameter. However, there are several drawbacks to doing this. For one, increasing the diameter of the suspension component can significantly increase its weight. Additionally, a suspension component of larger diameter may fall outside of machine parameters and be unable to be formed because of its size. In fact, the larger diameter may only be necessary at a localized high stress area.

Hence, there is a need in the art for a method for enhancing the physical characteristics of a suspension component which does not significantly increase its weight and size.

SUMMARY OF THE INVENTION

Th is invention relates to a method for enhancing the physical characteristics of a localized area of a suspension component. Material is selectively added to locations of high stress on the suspension component.

In a first embodiment of the invention, a sleeve is fitted over the exterior surface of the suspension component (either solid or tubular) at the locations of high stress. A heating/cryogenic technique is used to create an interference fit between the suspension component and the sleeve. The suspension component with the sleeve positioned on its exterior surface is then formed. In the preferred embodiment, the sleeve is made of titanium.

In another embodiment, a core is inserted into a tubular suspension component either locally at points of high stress or entirely along its length. A heating/cryogenic technique is used to create an interference fit between the core and the tubular suspension component. The suspension component is then formed with the core positioned within the suspension component. In the preferred embodiment, the core is made of a resin type material. The core can also be made of steel.

In another embodiment, winding filaments of composite material are layered over the suspension component at the points of high stress after the suspension component is formed.

In another embodiment, powdered material is applied to the suspension component at the points of high stress by spraying or welding techniques. The material can be applied when the suspension component is either formed or unformed.

In many applications, the high stress areas are at a bend or curve. The added material is preferably added, then the component is heated or curved.

Accordingly, the present invention provides a method for enhancing the physical characteristics of a localized area of a suspension component.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1A:
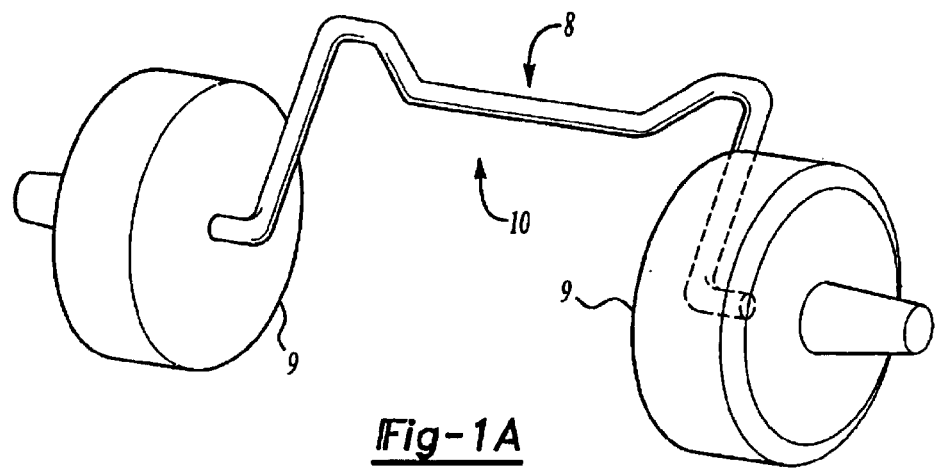
FIG. 1A illustrates a schematic view of a suspension component mounted on a vehicle.

While the invention may be susceptible to embodiments in different forms, there is shown in the drawings, and herein will be described in detail, specific embodiments with the understanding that the present disclosure is to be considered an exemplification of the principles of the invention, and is not intended to limit the invention to that as illustrated and described herein.

Figure 1B:
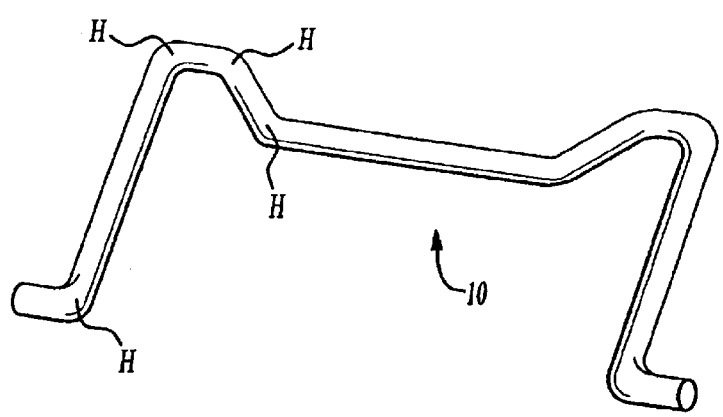
FIG. 1B illustrates a schematic view of a formed suspension component of a vehicle suspension system.

FIG. 1A shows a suspension component 10 on a vehicle 8 mounted between wheels 9. As known, the suspension component 10 provides a stabilizer function. FIG. 1B illustrates a schematic view of a formed suspension component 10 of a vehicle suspension system. As shown there are several bends or curves H. These may be high stress areas which could be addressed by the invention. The figure shows a stabilizer bar, but the invention extends to other suspension components.

Figure 2:
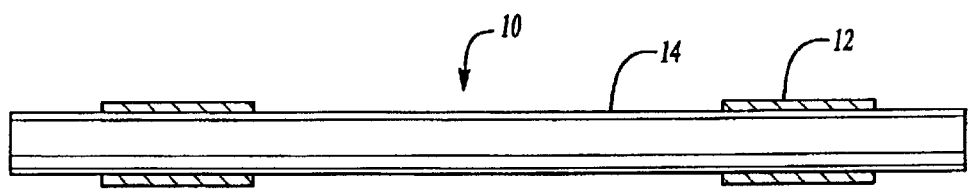
FIG. 2 illustrates a cross sectional view of an unformed suspension component with sleeves positioned over points of high stress.
Figure 3:
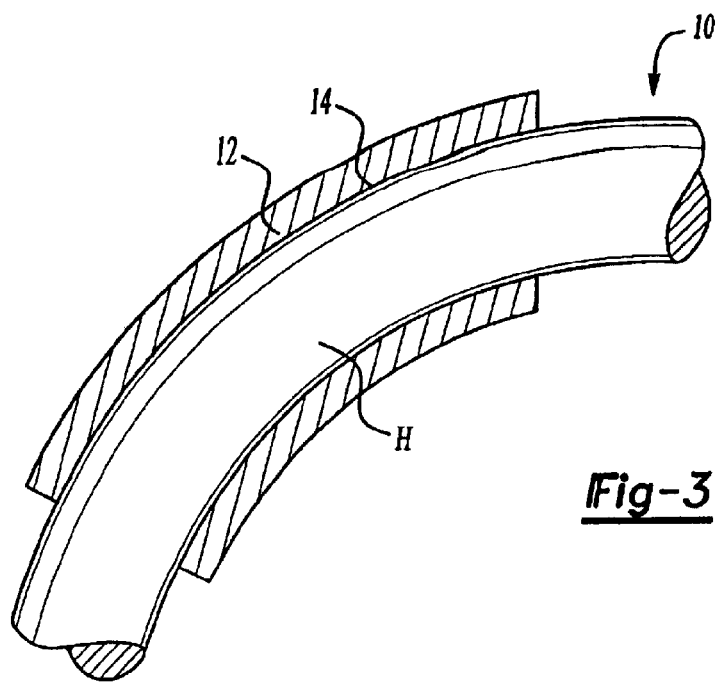
FIG. 3 is a sectional view of a cross section of a formed suspension component with a sleeve positioned over a point of high stress.

FIGS. 2 and 3 illustrate a first embodiment of the present invention. As shown in FIGS. 2 and 3, a sleeve 12 is positioned over the exterior surface 14 of an unformed suspension component 10 at points of high stress H to increase the stiffness of the suspension component 10. The suspension component 10 can either be tubular or solid. The sleeve 12 can comprise of any high strength material. In the preferred embodiment, the sleeve 12 is comprised of titanium.

Next, the use of heat/cryogenic technique is used to create an interference fit between the suspension component 10 and the sleeve 12. This is accomplished by heating the suspension component 10 and cooling the sleeve 12. This technique expands the suspension component 10 and shrinks the sleeve 12, creating an interference fit between the two components. Other interference fit techniques can be used.

Once the sleeve 12 is positioned and fitted on the exterior surface 14 of the suspension component 10, the suspension component 10 can be formed. As shown in FIG. 3, this is accomplished by bending the component 10 at point of high stress H. By positioning the sleeve 12 only over the points of high stress H, the stiffness of the suspension component 10 can be increased without a significant increase in the overall weight and diameter of the suspension component 10.

Figure 4:
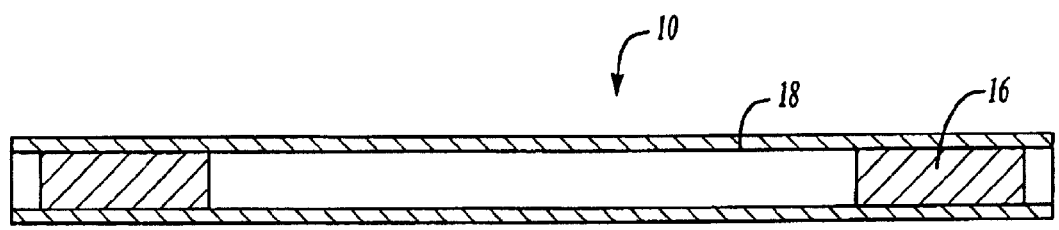
FIG. 4 illustrates a cross sectional view of an unformed suspension component with cores positioned at points of high stress.
Figure 5:
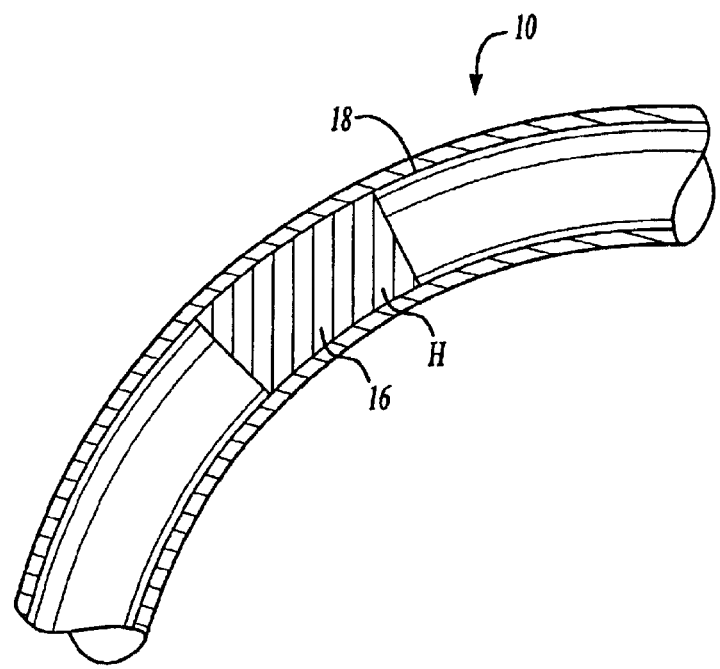
FIG. 5 illustrates a sectional view of a cross section of a formed suspension component with a core positioned at a point of high stress.

FIGS. 4 and 5 illustrate another embodiment of the present invention. As shown in FIGS. 4 and 5, a-core 16 is inserted into the interior surface 18 of an unformed suspension component 10 at points of high stress H. In this embodiment, the suspension component 10 is tubular.

In the preferred embodiment, the core 16 is comprised of a resin type material and can be positioned either locally at the areas of high stress H or along the entire length of the suspension component 10. The core 16 can also be comprised of steel. If the core 16 is comprised of steel, the core 16 is preferably positioned only locally at areas of high stress H, rather than along the entire length of the suspension component 10, to reduce weight.

A heat/cryogenic technique is then used to create an interference fit between the suspension component 10 and the core 16. In this step, the suspension component 10 is cooled and the core 16 is heated. The expansion of the core 16 and the shrinking of the suspension component 10 creates an interference fit between the two components. The suspension component 10 is then formed with the core 16 positioned inside the suspension component 10 at points of high stress H. Again, other interference fit techniques can be used. As shown in FIG. 5, the component 10 is then bent to form area H.

Figure 6:
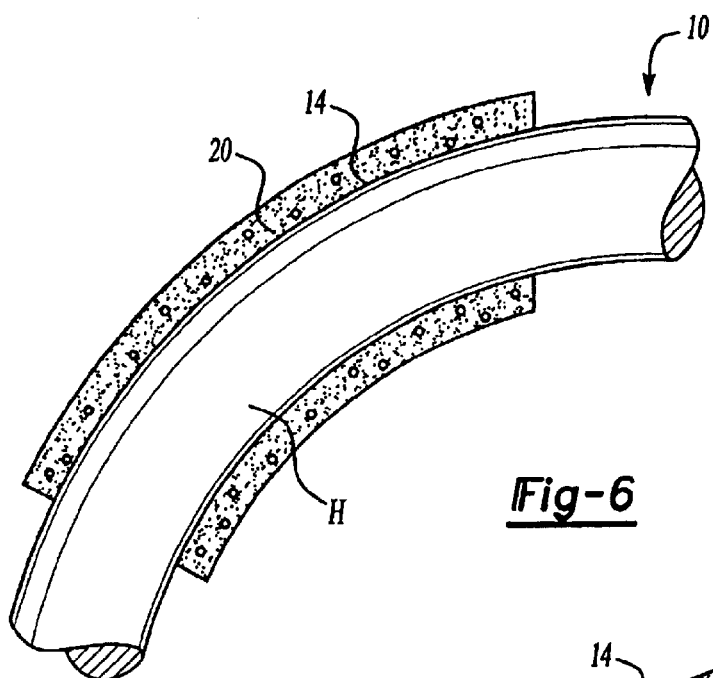
FIG. 6 illustrates a sectional view of a formed suspension component with winding filaments layered over a point of high stress.

In another embodiment, as shown in FIG. 6, winding filaments 20 of composite material are layered over the exterior surface 14 of the suspension component 10 at areas of high stress H. The winding filaments 20 are layered over the suspension component 10 after it has been formed. Filaments 20 can be an appropriately selected high strength material. As an example, appropriate glass fibers and plastic composites may be used.

Figure 7:
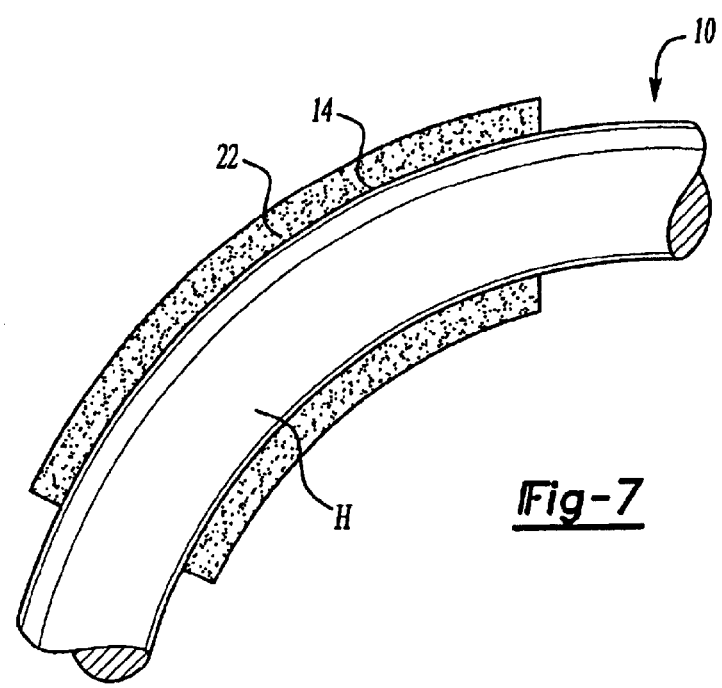
FIG. 7 illustrates a sectional view of a formed suspension component with powered material applied to a point of high stress.

FIG. 7 illustrates another embodiment of the present invention. In this embodiment, powdered material 22 is applied by a spraying or welding technique to the exterior surface 14 of the suspension component 10 at locations of high stress H. The powdered material 22 can be applied either before or after the suspension component 10 has been formed. As with the prior embodiments discussed above, by applying the powered material 22 only to locations of high stress H, the weight and diameter of the suspension component 10 can be significantly reduced. Again, appropriate material for coating will be selected.

Once additional or different materials are added to the locations of high stress H of the suspension component 10, the novel advantages of this invention will become apparent. For one, by selectively adding different materials to the suspension component 10 at only the locations of high stress H, the stiffness of the suspension component 10 can be increased at the desired locations without a substantial increase in the overall weight and diameter. This can be accomplished because the additional material is added only to the areas of high stress H, rather than to the entire length of the suspension component 10. Additionally, because the overall diameter of the suspension component 10 is not increased, the suspension component 10 will still fall within machine parameters, allowing the suspension component 10 to be formed.

Accordingly, the present invention provides a method for enhancing the physical characteristics of a localized area of a suspension component 10 by adding material to the points of high stress H, without a significant increase in the weight and diameter of the suspension component 10. The invention also allows the suspension manufactures to simply and inexpensively manufacture a variant component such as for low protection runs. As an example, a standard component could be designed. A simple modification of the basic component by this invention allows the component to be tailored to a "sport" or high stress application.

The foregoing description is exemplary rather then defined by the limitations within. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for enhancing the physical characteristics of a suspension component of a vehicle suspension system, said suspension component having an exterior surface, comprising the steps of:

selectively adding an outer sleeve over said exterior surface of said suspension component at locations of high stress; and forming said suspension component after selectively adding said outer sleeve to said suspension component at locations of high stress.

2. The method as recited in claim 1 further comprising the step of fitting said outer sleeve over said exterior surface of said suspension component and then interference fitting said outer sleeve on said suspension component.

3. The method as recited in claim 1 wherein said locations of high stress are bends.

4. The method as recited in claim 1 further including the step of bending said suspension component at the point of said outer sleeve.

5. The method as recited in claim 1 wherein said suspension component is solid.

6. The method as recited in claim 1 further comprising the step of heating said suspension component after the step of selectively adding said outer sleeve and before the step of forming said suspension component.

7. The method as recited in claim 1 wherein the step of forming said suspension component includes forming said suspension component at said locations of high stress.

8. An enhanced suspension component of a vehicle suspension system comprising:

a suspension component having an exterior surface; and an outer sleeve fitted over said exterior surface of said suspension component at localized areas whereby said outer sleeve is selectively added to said suspension component at locations of high stress.

9. The enhanced suspension component as recited in claim 8 wherein said outer sleeve is comprised of titanium.

10. The enhanced suspension component as recited in claim 8 wherein said suspension component is solid.

* * * * *